Sept. 17, 1968  L. A. ERICKSON  3,401,570

VARIABLE SPEED TRANSMISSION

Filed Jan. 20, 1966  4 Sheets-Sheet 1

Leonard A. Erickson
INVENTOR.

BY Jerome R. Cox

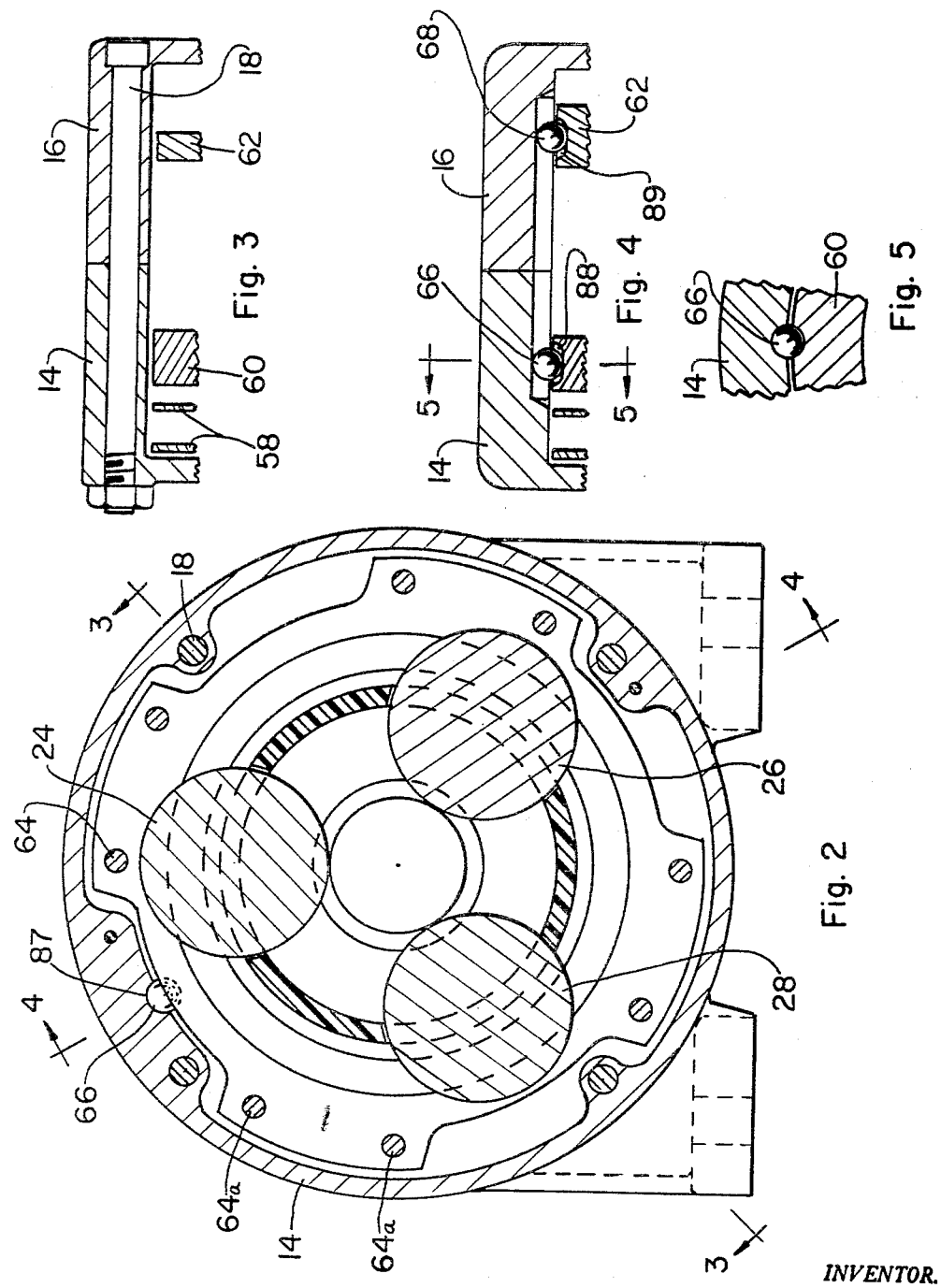

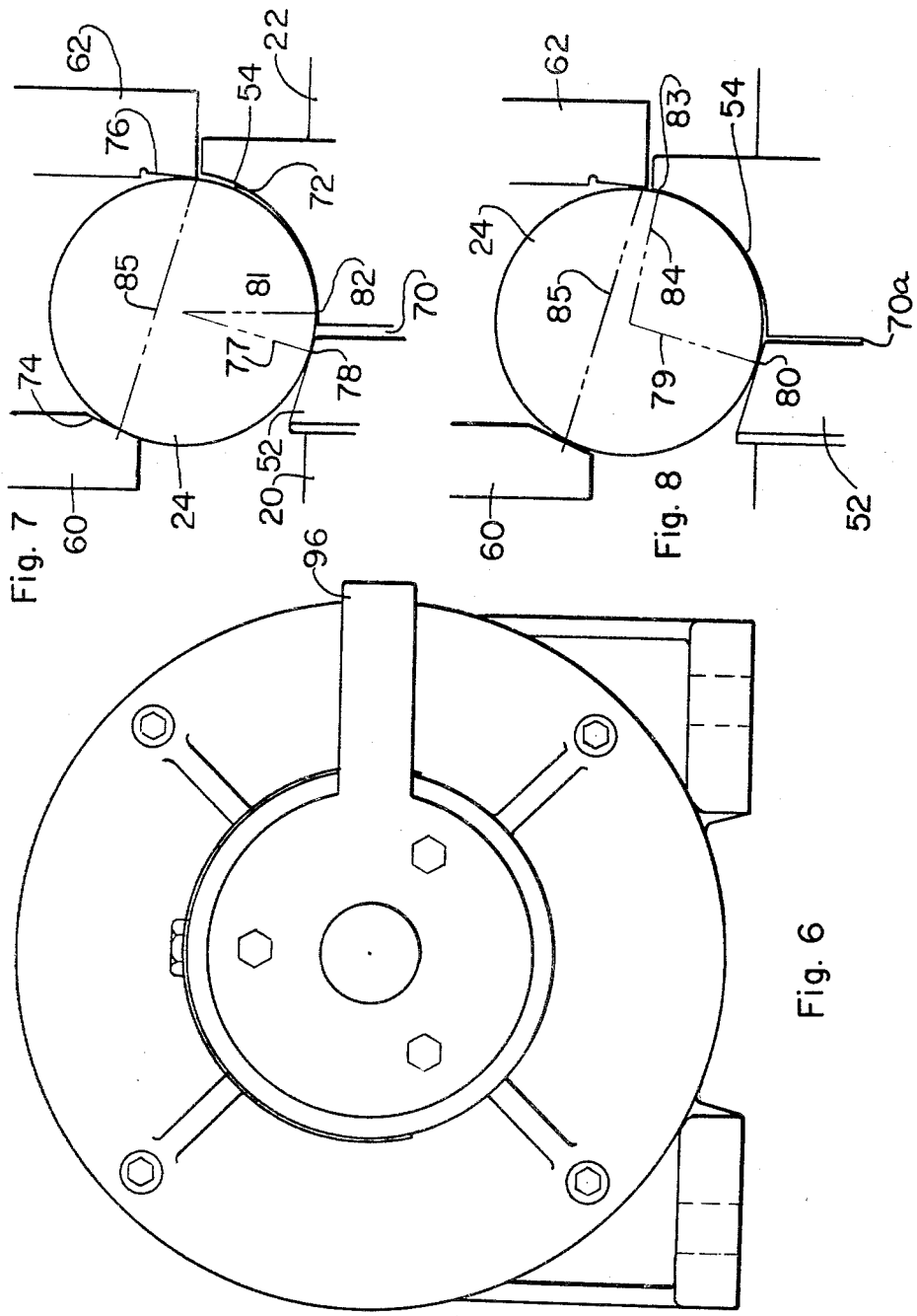

INVENTOR
LEONARD A. ERICKSON
BY-
Jerome R. Cox

United States Patent Office 3,401,570
Patented Sept. 17, 1968

3,401,570
VARIABLE SPEED TRANSMISSION
Leonard A. Erickson, 4354 Blythe Road,
Columbus, Ohio 43224
Filed Jan. 20, 1966, Ser. No. 521,992
13 Claims. (Cl. 74—193)

ABSTRACT OF THE DISCLOSURE

An orbital ball transmission is described having: an outer, stationary race comprising a pair of spaced, circular, resiliently axially separable, surfaces against which the balls roll; an inner frusto-conical race concentrically fixed to the input shaft and in driving contact with the balls; and an inner concave race concentrically fixed to the output shaft and in driving contact with the balls. Means are provided to axially movably adjust the output shaft to vary the point of contact between the balls and the concave race.

---

This invention relates generally to variable speed power transmission devices, and more particularly to mechanical infinitely variable frictional drive devices of this type wherein one or more spheres is employed in the transmission of power or movement from the input to the output.

PRIOR ART

Heretofore devices of this type have often employed rollers and disks in combination with a sphere or spheres to transmit such movement. One popular scheme has been to interpose a sphere or spheres between rotatable disks driven by a source of input power or motion and a rotatable roller connected to an output shaft. In such case, the ratio of the speed of rotation of the roller relative to the speed of rotation of the disk depends on the distance of the point of contact of the sphere or spheres with the disk from the center of rotation of the disk (i.e. the radial displacement of said point). Obviously this point of contact may be shifted by various mechanical means many of which are illustrated in the patent literature. Various modifications of such scheme have been tried. Obviously the input can be to the roller or to a plurality of rollers with the output either from a rotatable disk or other rollers. A plurality of disks may be used with the elimination of the rollers.

Such devices have been used in analogue computer devices as for example as integrators, differentiators, and in devices for performing many other mathematical functions; fire control directors; target motion generators, etc.; in computing data for land, air and sea navigation; in gyroscoping operation and testing; for recording liquid flow; industrial process control; material handling work positioning; machine tool control welding feed, etc.

Devices constructed according to my invention are useful for all of the above as well as for transmitting motion and/or power from a primary shaft to a secondary shaft wherever and for whatever purpose such motion or power may be desired, but, I believe that devices constructed in accordance with the invention will find their uses primarily in the fields of industrial application where often a wide range of infinitely variable speed drives are required.

OBJECTS

One object of my invention is to provide a variable speed transmission device embodying improved means for transmitting motion frictionally from a primary shaft to a secondary shaft.

A further primary object of the invention is to provide an improved drive mechanism functioning for the purposes desired and fulfilling all of the necessary requirements thereof.

A further object is to provide improved drive mechanisms of the type described which are composed of a minimum of parts, are ruggedly constituted and economical to build.

A further object is to provide an improved drive mechanism of the type described which is provided with an automatic take-up for wear.

A still further object is to provide a drive mechanism of the type described having a plurality of balls or spheres employed in the friction drive, a minimum value of contact stress in order to achieve a high output torque with a low speed drive at the output shaft.

A still further object is to provide a drive mechanism of the type described having a wide speed ratio so as to provide a wide speed range of speed at the output dependent upon a uniform input speed.

One of the features of my invention is the provision of a pair of substantially aligned shafts one of which is an input shaft and the other of which is an output shaft, having means comprising a plurality of spheres or balls each contacted by the inner ends of both shafts for transmission of motion and power from the input shaft to the output shaft at an infinitely variable speed ratio.

A further feature is the combination with the above of means for moving at least one of the shafts axially inward to cause a displacement of the balls radially outward and to cause a consequential change in speed ratio.

A further feature is the provision of means to apply pressure to increase the value of output torque at low speeds.

A further feature is the provision of means to insure uniform wear of the balls and to provide automatic take-up of the motion transmission mechanism to compensate for any wear.

Other objects, features, and advantages of my invention, I believe, will be apparent from a reading of the following specification and claims and from comparison with the accompanying drawings wherein illustrations (partly schematic) of an embodiment of my invention are provided and wherein like numerals represent similar elements of the embodiment illustrated.

In the drawings:

FIG. 2 is a vertical sectional view taken along the line 2—2 of FIG. 1;

FIG. 3 is a fragment of a sectional view taken along the line 3—3 of FIGURE 2;

FIG. 4 is a fragment of a sectional view taken along the line 4—4 of FIGURE 2;

FIG. 5 is a fragmentary sectional view taken along the line 5—5 of FIG. 4;

FIG. 6 is a view in end elevation of the embodiment of my invention illustrated in FIGURES 1-5, inclusive;

FIG. 7 is a schematic view (on a scale somewhat larger than the scale of FIGURES 1-6, inclusive) showing the essential elements of the motion transmission device illustrating my invention and showing the device in the position of the parts when the ratio is low and the output is at a relatively high speed;

Figure 1:
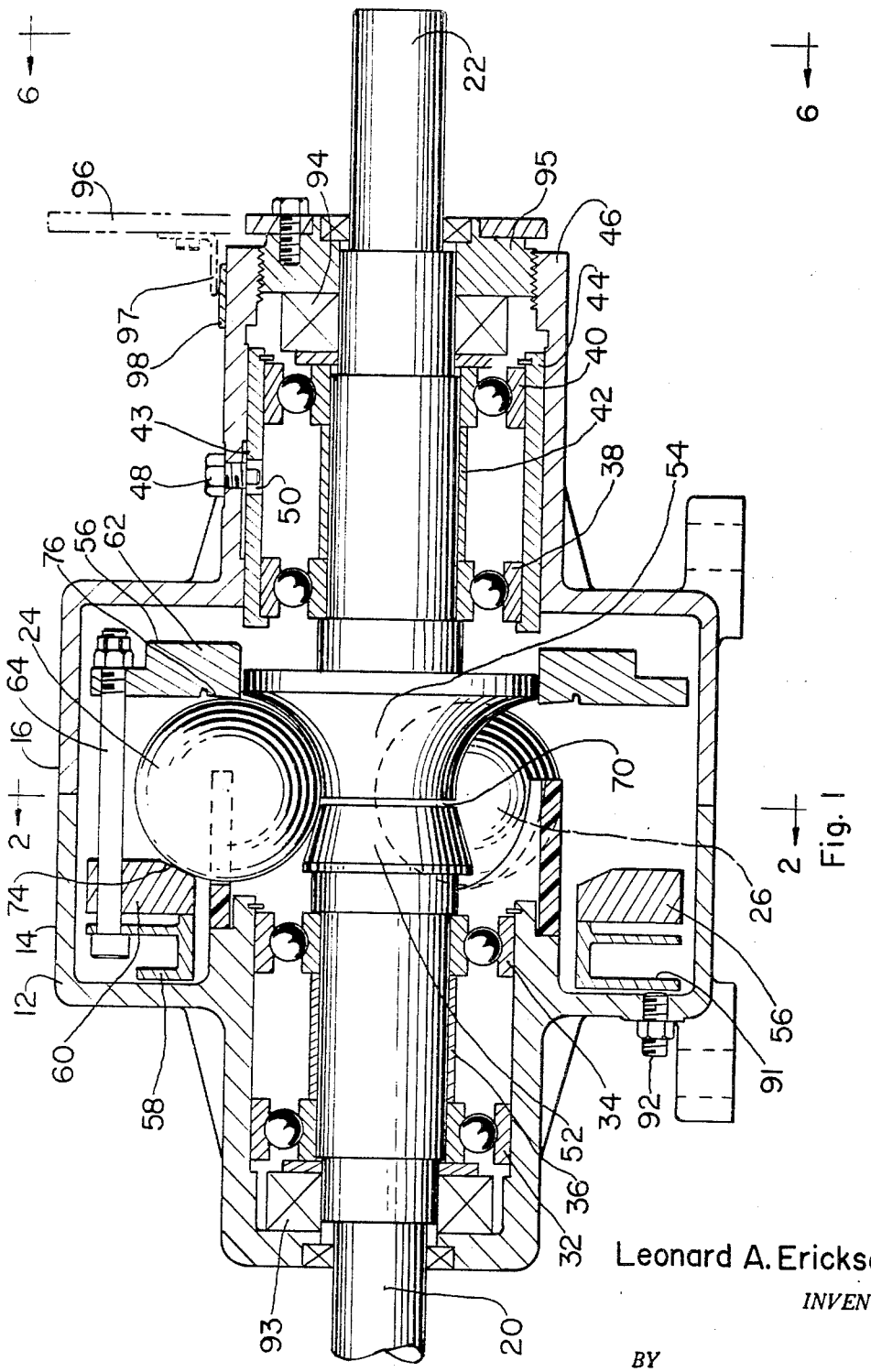
FIG. 1 is a vertical sectional view taken generally along the longitudinal axis of an illustrative embodiment of my invention, certain shafts and one of the balls which might normally be shown in section, being shown, however, in section.
Figure 9:
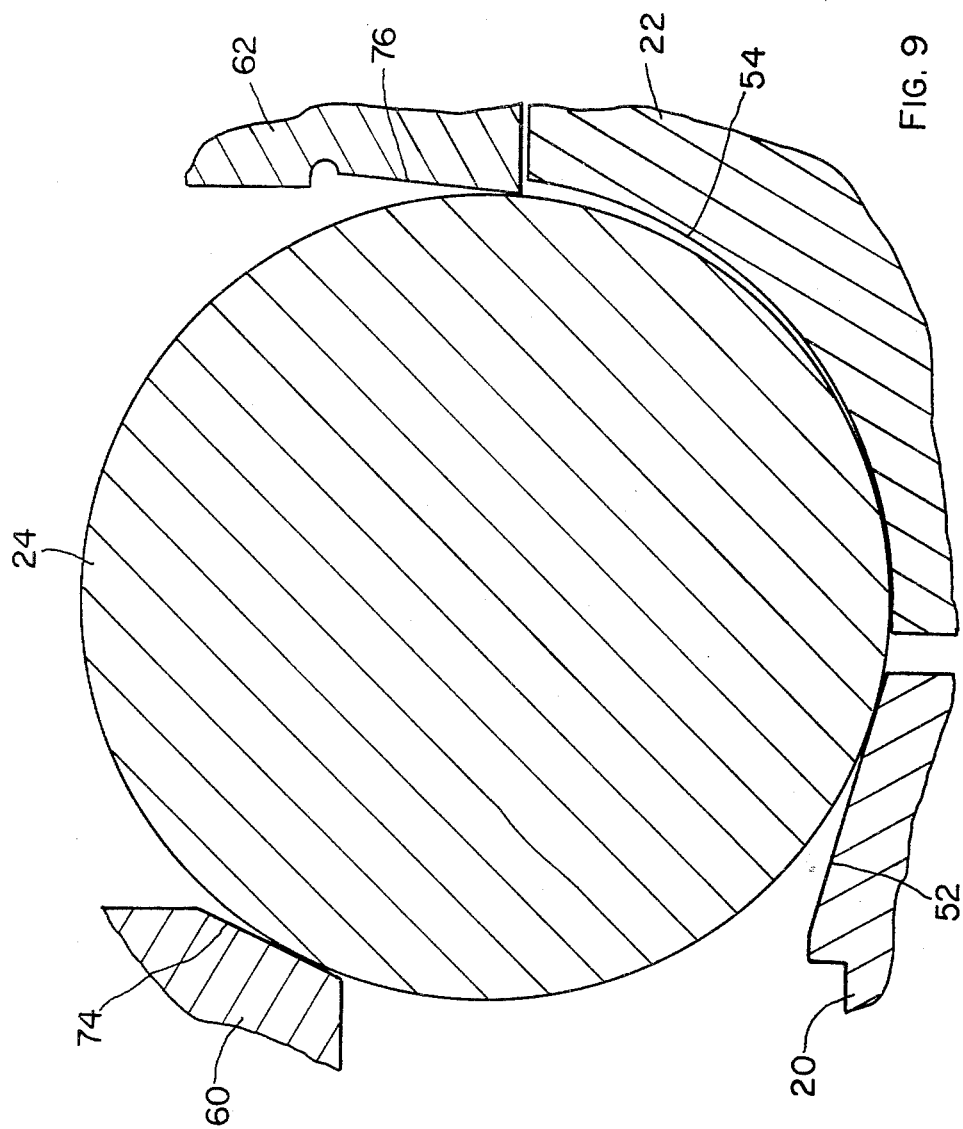

FIG. 8 is a schematic view similar to FIGURE 7 showing the device in the position of the parts when the ratio is high and the output is at a relatively low speed; and FIG. 9 is a fragmentary sectional view in vertical section taken on the same plane as FIG. 1 but showing only a small portion thereof on a greatly enlarged scale to show more clearly the position of the parts when the ratio is low and the output is at a relatively high speed.

DETAILED DESCRIPTION

Referring to the drawings, and especially to FIGURE 1 thereof, I have shown a housing 12 composed of halves 14 and 16 secured together by bolts such as 18 (see FIGURE 3). Within the housing I have shown a motion transmission device by which motion is transmitted in a variable ratio as desired from a drive (driven input) shaft 20 to an output shaft 22. Interposed functionally between these shafts is a motion transmitting mechanism consisting of a plurality of spheres or balls such as 24, 26, and 28 (24 and 26 being shown in FIG. 1, and 28 as well as 24 and 26 being shown in FIG. 2). I prefer to use three or more balls.

The shaft 20 is journalled in bearings 32 and 34, the bearings being maintained in spaced relationship by spacers such as 36. The output shaft 22 is journalled in bearings 38 and 40, said bearings being maintained in spaced relationship by spacers such as 42. The assembly 43, including the shaft 22, the bearings 38 and 40 therefor, and the spacers 42, are mounted within an axially slidable and keyed sleeve 44. The sleeve 44 is mounted in an output end cylindrical extension 46 of the housing half 16. A screw threaded shoulder stud 48 secured to the extension 46 extends into an elongated hole 50 formed in the sleeve 44 and prevents the assembly 43 from rotating.

The inner end of the shaft 20 is formed with a cone shaped terminal portion 52, and the inner end of the shaft 22 terminates in a concave curved shape 54. The curve may be the inner surface of a sphere or it may be parabolic or hyperbolic or any other curved surface shape designed for the particular change of rate of speed desired. The ends of shafts 20 and 22 cooperate with each other with an outer cage or race which I will next describe to contain and hold the balls 24, 26 and 28 in operating position. The shaft ends 52 and 54 thus form the equivalent of a divided inner race for the balls 24, 26, and 28 (see FIG. 2).

The equivalent of an outer race or track for the balls 24, 26, and 28 is provided for by the axially floating assembly 56 which is formed by the spring ring 58, contact ring 60, contact ring 62, connecting bolts such as 64 and keying balls 66 and 68 (see FIG. 4).

More details of the race for the balls is shown on an enlarged scale in FIG. 9.

The curved shape may be (as shown) one in which the surface is concave and is uniformly curved with a radius of curvature slightly larger than the radius of curvature of balls 24, 26, and 28.

Referring again to FIGURE 1, it may be seen that in the position of the parts shown, the space 70 between the adjacent ends of the input shaft 20 and the output shaft 22 is greater than the space 72 between the drive balls 24, 26, or 28, and the concave curved surface 54 at the largest diameter of the inner end of the output shaft 22. The cone surface 74 of contact ring 60 and the cone surface 76 of contact ring 62 cooperate to form a low included angle which restrains the balls 24, 26, and 28 causing them to maintain contact with the cone surface 52 of shaft 20 and the concave curved surface 54 of the shaft 22.

The position of the balls and of the output shaft in FIGURE 1 is the high speed position of the parts. In the schematic illustration of FIGURE 7, which also shows the high speed position, the fixed angle of contact of the balls with the input shaft cone 52 is indicated by the radial line 77 which leads to the input contact point 78. In FIG. 8, the radial 79 leads to input contact point 80 which is almost identical with point 78. The variable angle of contact with the output shaft surface 54 is indicated by the radial line 81 which leads to the high speed output contact point 82. With relation to the geometry of the device as shown in FIGURE 7, the ratio of the input speed to output speed is near to unity. In FIGURE 8, another position of the parts is shown. Therein the output shaft 22 has been displaced axially inwardly so that the gap 70a has been reduced, the balls 24, 26, and 28 have been urged upward on the sloping surface of the cone 52, moving from contact point 78 to contact point 80, and the contact point of the balls on the curved surface 54 has shifted from contact point 82 to point 83 which is at the end of radius 84. The points of contact of the ball 24 with the conical surfaces 74 and 76 of the contact rings 60 and 62 is shown in FIGS. 7 and 8. As the balls 24, 26, and 28 are urged upward along the sloping surface of the cone 52, the orbital diameter increases and the contact rings 60 and 62 separate axially, the spring member 90 of the spring ring 58 flexing and increasing the contact pressure at the conical surfaces 74 and 76, also increasing in a lesser degree, the contact pressure at point 80 (see FIGURE 8). The rolling plane line of the ball 24 indicated at 85, while it does not constitute a diameter of the ball 24, does not vary with respect to the center of the ball but does vary in its orbital relationship with the center of the shafts 20 and 22. It will be seen that in FIG. 8, the point 83 at the end of radius 84 has shifted very close to the rolling plane line 85. In this position it is evident that the ratio of action through the balls is much higher because of this nearness of contact point 83 to the rolling plane line 85. This ratio is multiplied by the inverse proportion of the radii of the points 82 and 83 of the output shaft whereas the increase of radius in the input shaft of points 78 and 80 is comparatively small.

Uniform wear of the traction balls 24, 26, and 28 is assured by making the angle of the cone 52 such that radial line 77 of FIG. 7 or the radial line 79 of FIGURE 8 is not quite a right angle with the rolling plane 85.

In changing from a near unity speed relationship to a high ratio relationship wherein the output shaft is driven at low speed, outer track floating assembly 56 is carried in the direction of the input shaft (i.e. to the left in FIG. 1), this action being permitted by the rolling action of keying balls 66 and 68 in the half-round grooves 87 in the housing and 88 and 89 in the assembly members 60 and 62 respectively. In the assembly of the outer track floating assembly 56, the connecting bolts 64 are tightened so that the spring member 90 of the spring ring 58 is deflected to cause an axial high-load squeeze on the balls 24, 26 and 28. The radial vector of this force creates the normal driving contact forces on the cone 52 and the surface 54 on the output shaft 22. In progressing from high speed to low speed, the contact point on surface 54 moves from point 82 to point 83 and the normal driving contact force would be expected to be reduced to a low value because of the high position of the radial line 84 in FIGURE 8. This reduction in contact force is compensated for when spring member 91 of the spring ring 58 makes contact with the low speed torque adjusting screws 92 thereby causing the contact force at point 83 to be established at a pre-set high level and the resulting output torque to be raised to an acceptable value. As the balls 24, 26, and 28 move up the slope of the cone 52, the balls cause the contact rings 60 and 62 to separate a small additional amount which causes a small additional flexure of the spring member 90 of the spring ring 58. The increased flexure of 90 also increases the normal tractive pressure which adds to the torque at the output shaft.

As stated above, in FIGURES 1 through 6, 12 generally represents a housing or frame or supporting enclosure made divisible into halves indicated as 14 and 16 and secured together by bolts such as 18. As shown in FIGURE 1, a thrust bearing 93 in housing half 14 assumes the axial load on the input shaft 20, and a thrust bearing 94 in housing half 16 assumes the axial loading of the output shaft 22. The shaft 22 may be caused to move axially by a screw plug 95 threaded into the housing 16. A control handle 96 (shown in FIGURE 6) is an embodiment of a manual control for translating the bearing 94. Automatic means can be substituted for such manual control if desired. Approximately one half turn of screw plug 95 will suffice to cover the entire range of output speeds, the output shaft 22 moving axially in or out of the housing half 16 during the change of speed. Pointer 97 which is attached to handle 95 points to ratio or speed indicating graduations on dial strip 98.

Throughout, a typical and preferred embodiment has been shown and described. However, other modifications are intended to be covered. For example, three traction balls are shown but a different number of balls could be used; the concave curved surface 54 could be modified to favor more uniform spacing of the speed graduations on the dial strip 98. Means could also be employed, if desired, to eliminate the need for any external axial movement of the output shaft 22.

It is believed, however, that use of the close fitting concave-curved surface combined with the expandable and floating outer track is unique in accomplishing the above. It is believed that the above detailed description substantiates the outlined objects and advantages of this invention, but it is to be understood that the above described embodiments, although preferred embodiments, are for the purpose of illustration only, and many changes may be made without departing from the spirit and scope of the invention which is to be construed and interpreted in the light of the following claims.

I claim:
1. A transmission of the type having a housing, a first shaft journalled to the housing, a second shaft journalled to the housing, and a spherical ball for drivingly connecting the first shaft to the second shaft, wherein the transmission comprises
   (a) a first race wall concentrically fixed to the first shaft for rotation therewith and in driving contact with the ball;
   (b) a second concave race wall concentrically fixed to the second shaft for rotation therewith, in driving contact with the ball, and having a radius of curvature greater than the radius of the ball;
   (c) means for axially movably adjusting one of said shafts; and
   (d) a stationary race wall comprising a pair of spaced, circular surfaces against which the ball orbitally rolls positioned with the ball radially intermediate the stationary race wall and the first and second race walls;
wherein a frusto-conical rolling surface is generated by the orbital movement of said ball and wherein axial movement of one of said shafts varies the distance between the rolling surface and the point of contact of the ball with the concave race wall.

2. A transmission according to claim 1 wherein the stationary race wall comprises a pair of contact rings co-axially surrounding said first and said concave race walls.

3. A transmission according to claim 1 wherein the spaced circular surfaces of the stationary race wall are axially resiliently separable.

4. A transmission according to claim 1 wherein the first race wall is frusto-conical and is substantially parallel to said rolling surface.

5. A transmission according to claim 1 wherein the first race wall is slightly inclined to the rolling surface.

6. A transmission according to claim 1 wherein a plurality of orbiting balls are provided separated by a ball carrier.

7. A transmission according to claim 1 wherein
   (a) the shafts are co-axially aligned;
   (b) the stationary race wall comprises a pair of resiliently separable contact rings co-axially surrounding said first and said concave races;
   (c) the first race wall is substantially frusto-conical and is substantially parallel to said rolling surface; and
   (d) a plurality of orbiting balls are provided separated by a ball carrier.

8. The structure of claim 1 in which the spherical balls are confined in an outer expandable cage and thus held in variable contact relationship with the first race wall and the concave race wall; and in which there is provided means for expanding and contracting said cage to vary the points of contact of said balls with said races to vary the ratio of speed transmission between said shafts.

9. The structure of claim 8 in which there is provided spring means for providing axial force on said balls to obtain tractive force between the balls, the first race and the concave race.

10. The structure of claim 9 in which additional means is provided to intensify said axial force for low speed output.

11. The structure of claim 8 wherein there is provided means dependent upon an axially floating mechanism for providing axial force to obtain tractive force between the balls, the first race and the concave race.

12. A variable speed transmission as defined in claim 8 wherein there is provided means for moving the balls radially as well as axially in order to adjust the speed ratio between the shafts.

13. An improved transmission of the type having a pair of co-axially aligned rotatable shafts, a plurality of races, a plurality of balls, and a ball carrier, the improvement comprising
   a stationary race wall comprising a pair of spaced circular surfaces.

References Cited
UNITED STATES PATENTS
| | | | |
|---|---|---|---|
| 1,850,189 | 3/1932 | Weiss | 74—190.5 |
| 1,985,110 | 12/1934 | Sharpe | 74—190.5 |
| 2,272,509 | 2/1942 | Cauallo | 74—193 |

FOREIGN PATENTS
| | | |
|---|---|---|
| 340,108 | 9/1959 | Switzerland. |
| 702,761 | 1/1954 | Great Britain. |
| 921,030 | 1/1947 | France. |

C. J. HUSAR, *Primary Examiner.*